United States Patent
Kato et al.

(10) Patent No.: US 8,470,728 B2
(45) Date of Patent: Jun. 25, 2013

(54) EXHAUST GAS PURIFYING CATALYST

(75) Inventors: Yasuyoshi Kato, Kure (JP); Keiichiro Kai, Kure (JP); Naomi Imada, Kure (JP)

(73) Assignee: Babcock Hitachi Kabushiki Kaisha, Tokyo (JP)

( * ) Notice: Subject to any disclaimer, the term of this patent is extended or adjusted under 35 U.S.C. 154(b) by 504 days.

(21) Appl. No.: 12/095,964

(22) PCT Filed: Sep. 7, 2007

(86) PCT No.: PCT/JP2007/067496
§ 371 (c)(1),
(2), (4) Date: Mar. 22, 2010

(87) PCT Pub. No.: WO2009/031234
PCT Pub. Date: Mar. 12, 2009

(65) Prior Publication Data
US 2010/0183492 A1  Jul. 22, 2010

(51) Int. Cl.
*B01J 27/199* (2006.01)
*B01J 27/19* (2006.01)
*B01D 53/56* (2006.01)
*B01D 53/64* (2006.01)

(52) U.S. Cl.
USPC ......... 502/209; 502/210; 502/211; 423/239.1

(58) Field of Classification Search
USPC .................. 502/209, 210, 211; 423/239.1
See application file for complete search history.

(56) References Cited

FOREIGN PATENT DOCUMENTS

| JP | 2000-471 A | * | 1/2000 |
|---|---|---|---|
| JP | 2001-172879 | | 6/2001 |
| JP | 2005-342711 A | * | 12/2005 |
| JP | 2006-298248 | | 11/2006 |

* cited by examiner

*Primary Examiner* — Elizabeth Wood
(74) *Attorney, Agent, or Firm* — Fay Sharpe LLP

(57) ABSTRACT

To overcome the problem of a conventional catalyst and to provide an exhaust gas purifying catalyst that meets the requirement concerning Hg oxidation activity and $SO_2$ oxidation activity; i.e., an exhaust gas purifying catalyst which specifically reduces percent $SO_2$ oxidation, while maintaining percent Hg oxidation at a high level.

The invention provides an exhaust gas purifying catalyst which comprises a composition containing oxides of (i) titanium (Ti), (ii) molybdenum (Mo) and/or tungsten (W), (iii) vanadium (V), and (iv) phosphorus (P), wherein the catalyst contains Ti, Mo and/or W, and V in atomic proportions of 85 to 97.5:2 to 10:0.5 to 10, and has an atomic ratio of P/(sum of V and Mo and/or W) of 0.5 to 1.5, and an exhaust gas purifying method comprising exposing an exhaust gas containing a nitrogen oxide ($NO_X$) and metallic mercury (Hg) to the catalyst in the presence of ammonia as a reducing agent, to thereby perform reduction of $NO_X$ contained in the exhaust gas and oxidation of metallic mercury (Hg) contained in the exhaust gas.

12 Claims, No Drawings

EXHAUST GAS PURIFYING CATALYST

TECHNICAL FIELD

The present invention relates to an exhaust gas purifying catalyst; in particular, an exhaust gas purifying catalyst which maintains, at a high level, an activity of oxidizing elemental mercury (Hg) contained in coal combustion exhaust gas, as well as an activity of reducing nitrogen oxides contained in the gas by ammonia, and which suppresses, to a very low level, an activity of oxidizing $SO_2$ contained in the gas to $SO_3$. The present invention also relates to an exhaust gas treatment method by use of the catalyst, and to a method for producing the catalyst.

BACKGROUND ART

In recent years, in the United States and Europe, much attention has been paid to prevention of health problems caused by Hg, Pb, F, and other trace components contained in flue gas discharged from, for example, power plants, factories of various types, and automobiles, in addition to $NO_X$, $SO_X$, and the like contained in such flue gas. Thus, governments are now considering imposing restrictions to reduce the discharge amount of such components to a very low level. Specifically, as has been known, mercury discharged from a coal-fired boiler is mostly released into the atmosphere in the form of metallic mercury having a high vapor pressure, then transformed into an organic mercury compound, and generally ingested by fish, shellfish, and the like organisms, to thereby produce harmful effects to human health. As has also been reported, 20% of American infants' neurologically impaired cases are suspected of being caused by mercury, in view that mercury causes grave deficit to the nervous system of growing infants. As described above, since mercury is highly toxic to humans, attempts have been made in various fields to reduce the discharge amount of mercury.

A typical known example of such attempts is a method in which, in the presence of a $NO_X$-removal catalyst or an improved product thereof, $NO_X$ contained in exhaust gas is reduced by $NH_3$, while highly volatile metallic mercury (elemental mercury, Hg) is oxidized into a mercury compound (e.g., mercury chloride); and subsequently, the thus-oxidized mercury compound is removed together with combustion ash or gypsum by means of an electric dust collector or desulfurization apparatus provided downstream of the exhaust gas treatment system (Patent Document 1). This method employs a catalyst containing titanium oxide, and an oxide of a metal (e.g., vanadium or tungsten) serving as an active component.

Meanwhile, in the case of NO removal of exhaust gas discharged from a boiler in which high-S-content coal (e.g., coal produced in the eastern United States) is used as a fuel, high percent $SO_2$ oxidation may cause an increase in amount of acidic ammonium sulfate precipitated in an air preheater provided downstream of the boiler, resulting in an increase in pressure loss, or may cause discharge of $SO_3$ through a smokestack, resulting in smoke or secondary pollution. Therefore, in recent years, demand has arisen particularly for a $NO_X$-removal catalyst which realizes low percent $SO_2$ oxidation. In general, such a $NO_X$-removal catalyst contains a small amount of vanadium, which is an active component of the catalyst.

Patent Document 1: Japanese Patent Application Laid-Open (kokai) No. 2005-125211

DISCLOSURE OF THE INVENTION

Problems to be Solved by the Invention

In the aforementioned conventional catalyst, Hg oxidation activity is predominantly provided by vanadium oxide, which is an active component, and thus an activity of oxidizing elemental mercury (Hg) can be enhanced by increasing vanadium content (V content). However, since a vanadium oxide has not only high Hg oxidation activity but also $SO_2$ oxidation activity, an increase in V content promotes $SO_2$ oxidation, and the resultant $SO_3$ contributes smoke pollution.

Thus, such a conventional catalyst, which faces a tradeoff between Hg oxidation activity and $SO_2$ oxidation activity, fails to satisfy the recent requirement for a $NO_X$-removal catalyst; i.e., attainment of both high Hg oxidation activity and low $SO_2$ oxidation activity.

In view of the foregoing, an object of the present invention is to overcome the trade off problem of the conventional catalyst and to provide an exhaust gas purifying catalyst that meets the aforementioned requirement concerning Hg oxidation activity and $SO_2$ oxidation activity; i.e., an exhaust gas purifying catalyst which specifically reduces percent $SO_2$ oxidation, while maintaining percent Hg oxidation at a high level.

Means for Solving the Problems

In order to achieve the aforementioned object; i.e., reduction in $SO_2$ oxidation activity without loss of Hg oxidation activity of a vanadium (V) compound, which is an active component, the present inventors have conducted extensive studies, and as a result have found that when a V oxide is caused to act on a specific amount of a phosphorus compound (e.g., phosphoric acid or a phosphate salt), the following desirable characteristics are obtained: (1) loss of Hg oxidation activity is virtually prevented; (2) $NO_X$-removal activity is reduced, but is maintained at a required minimum level; and (3) $SO_2$ oxidation activity is substantially reduced to zero. The present invention has been accomplished on the basis of this finding.

The aforementioned finding can be stated in another way; i.e., a V—P compound obtained by reacting a V compound on phosphoric acid or a phosphate salt exhibits (a) very low $SO_2$ oxidation activity, (b) moderate $NO_X$-removal activity, and (c) very high percent Hg oxidation. Therefore, as has been found, in the case where a catalyst containing such a V—P compound is employed, when percent $SO_2$ oxidation is allowed to be increased to a level corresponding to the aforementioned conventional catalyst, the V content of the V—P compound catalyst can be increased to several times that of the conventional catalyst, and thus the V—P compound catalyst realizes percent $NO_X$ removal comparable to that in the case of the conventional catalyst, and percent Hg oxidation drastically higher than that in the case of the conventional catalyst.

The present invention, which has been accomplished on the basis of the aforementioned finding, provides a $NO_X$-removal catalyst which realizes both low $SO_2$ oxidation activity and high Hg oxidation activity, and comprises a composition containing a metal oxide in which (i) Ti, (ii) Mo and/or W, and (iii) V are in atomic proportions of 85 to 97.5:2 to 10:0.5 to 10. In the $NO_X$-removal catalyst, the amount of a P compound added to the composition is regulated so as to satisfy the aforementioned characteristics (a), (b), and (c); specifically, the P compound (i.e., phosphoric acid or a phosphoric acid compound) is added in consideration of the amount of the P compound with respect to a V compound and to an Mo or W compound (i.e., another catalyst component which can react with phosphoric acid or a phosphoric acid compound), so that the atomic ratio of P/(sum of V and Mo and/or W) falls within a specific range (0.5 to 1.5).

Inventions as claimed herein are as follows.

(1) A catalyst for purifying an exhaust gas containing metallic mercury (Hg) comprising a composition containing oxides of (i) titanium (Ti), (ii) molybdenum (Mo) and/or tungsten (W), (iii) vanadium (V), and (iv) phosphorus (P), wherein the catalyst contains Ti, Mo and/or W, and V in atomic proportions of 85 to 97.5 : 2 to 10: 0.5 to 10, and has an atomic ratio of P/(sum of V and Mo and/or W) of 0.5 to 1.5.

(2) An exhaust gas purifying method comprising exposing an exhaust gas containing a nitrogen oxide ($NO_X$) and metallic mercury (Hg) to a catalyst as recited in (1) above in the presence of ammonia as a reducing agent, to thereby perform reduction of $NO_X$ contained in the exhaust gas and oxidation of metallic mercury (Hg) contained in the exhaust gas.

(3) A method for producing a catalyst as recited in (1), comprising adding water to titanium oxide, a soluble ammonium salt(s) of molybdic acid and/or tungstic acid, a soluble vanadium compound, and orthophosphoric acid or an ammonium phosphate salt; kneading the resultant mixture to thereby yield a paste; applying the paste to a metallic support; and calcinating the support.

(4) A method for producing a catalyst as recited in (1), comprising mixing titanium oxide, a compound represented by the formula $(NH_3)_3Mo_2V_3O_{15}$, and orthophosphoric acid or an ammonium phosphate salt with water; kneading the resultant mixture to thereby yield a paste; applying the paste to a metallic support; and calcinating the support.

(5) A method for producing a catalyst as recited in (1), comprising impregnating a catalyst carrier containing titanium oxide as a primary component with an aqueous mixture, a compound represented by the formula $(NH_3)_3Mo_2V_3O_{15}$, and orthophosphoric acid or an ammonium phosphate salt.

According to the invention as described in (1), there can be provided an exhaust gas purifying catalyst which maintains percent Hg oxidation and percent $NO_X$ removal at high levels, and which reduces percent $SO_2$ oxidation. According to the invention as described in (2), which is drawn to an exhaust gas purifying method employing the catalyst as recited in (1), metallic mercury can be highly oxidized and prevented from being discharged to the outside of the system, without causing problems (e.g., smoke) due to $SO_3$ generated by oxidation of $SO_2$. The invention as described in (3) or (4) is drawn to a highly practical production method for the catalyst as described in (1), and the invention as described in (5) is drawn to another production method for the catalyst of the present invention through an impregnation technique.

Effects of the Invention

The catalyst of the present invention, which is employed for exhaust gas purifying treatment, can considerably reduce $SO_2$ oxidation activity, while maintaining high mercury oxidation activity and considerable $NO_X$-removal activity. In the case where the catalyst is employed in practice in a catalyst unit, when percent $SO_2$ oxidation is allowed to be increased to a conventional level, the amount of the catalyst employed therein can be increased, and therefore the resultant catalyst unit exhibits excellent performance; i.e., very high mercury oxidation performance and $NO_X$-removal performance. Even when the catalyst is employed in the same amount as conventionally employed, since the catalyst realizes very low percent $SO_2$ oxidation, the vanadium content of the catalyst can be increased. Therefore, the resultant catalyst unit meets the recent requirement for a $NO_X$-removal catalyst; i.e., can solve the trade off problem of the conventional catalyst to realize low percent $SO_2$ oxidation and high percent mercury oxidation, which have failed to be achieved by the conventional catalyst.

BEST MODES FOR CARRYING OUT THE INVENTION

For production of the catalyst of the present invention, an important point is to determine the compositional proportion of the catalyst components so that the atomic proportions of Ti, Mo and/or W, and V are 85 to 97.5:2 to 10:0.5 to 10, and the atomic ratio of P/(sum of V and Mo and/or W) is 0.5 to 1.5. Particularly, the atomic ratio of P/(sum of V and Mo and/or W) is important. When the ratio is excessively low, effects by addition of P are insufficiently obtained, whereas when the ratio is excessively high, the catalyst components may be covered with a P compound, resulting in failure to attain high initial performance. Particularly when the atomic ratio of P/(sum of V and Mo and/or W) is determined to be 1 or thereabouts (0.7 to 1.2), more favorable effects are readily obtained.

Raw materials employed for preparing the catalyst may be any of oxides and salts of the aforementioned catalyst components, but, in the preparation of the catalyst, a P compound must be reacted with an Mo or W compound and a V compound. Therefore, when soluble salts of the respective compounds (e.g., ammonium salts of oxoacids of the corresponding elements) are mixed together in the presence of titanium oxide and water, favorable effects are readily obtained. Specifically, preferably, water is added to titanium oxide, a soluble ammonium salt of molybdic acid and/or tungstic acid, a soluble vanadium compound, and orthophosphoric acid or an ammonium phosphate salt; the resultant mixture is kneaded to yield a paste; and the paste is applied to a base material, followed by calcinating the base material, to thereby obtain a plate-like catalyst. When a plurality of the thus-obtained plate-like catalysts are stacked through a known method, and then subjected to molding so as to have a predetermined shape, the resultant catalyst structure may be employed as a catalyst unit which causes less clogging in the treatment of exhaust gas from a coal-fired boiler. A reinforcing agent (e.g., inorganic fiber) or a particulate binder (e.g., silica sol) may be added to the paste containing the catalyst components. Needless to say, such a modification falls within the scope of the present invention.

When a composite oxide represented by the formula $(NH_3)_3Mo_2V_3O_{15}$ disclosed in Japanese Patent Application Laid-Open (kokai) No. 2000-308832 is employed as a V—Mo compound, and is mixed with phosphoric acid or ammonium phosphate, a stable mixture (paste) can be prepared. The catalyst of the present invention may be produced by applying the thus-prepared paste to a catalyst support, followed by calcinating. Alternatively, the catalyst of the present invention may be produced by impregnating a titanium oxide ($TiO_2$) carrier with the above-prepared mixture.

EXAMPLES

The present invention will next be specifically described in detail by way of examples.

Example 1

Titanium oxide (specific surface area: 290 m$^2$/g, product of Ishihara Sangyo K.K.) (900 g), ammonium molybdate (107 g), ammonium metavanadate (28.3 g), 85% phosphoric acid (68.3 g), silica sol (trade name: OS Sol, product of Nissan Chemical Industries, Ltd.) (404 g), and water (50 g) were placed in a kneader, and then kneaded for 60 minutes. Thereafter, while silica-alumina ceramic fiber (product of Toshiba Fine Flex K.K.) (151 g) was gradually added to the mixture, the mixture was kneaded for 30 minutes, to thereby yield a catalyst paste having a water content of 27%. The paste was applied onto a base material (thickness: 0.7 mm) produced by subjecting a SUS 430 stainless steel plate (thickness: 0.2 mm) to a metal-lath processing; the base material was sandwiched between two polyethylene sheets; and the thus-sandwiched base material was passed through a pair of pressure rollers so that the meshes of the metal lath were filled with the paste. The paste-filled base material was air-dried, and then calcined at 500° C. for two hours, to thereby obtain a catalyst of the present invention. The catalyst was found to have a Ti/Mo/V (atomic proportions) of 93/5/2, and a P/(Mo+V) (atomic ratio) of 0.5.

Example 2

The procedure of Example 1 was repeated, except that ammonium molybdate was substituted by an equimole of ammonium metatungstate, to thereby obtain a catalyst of the present invention.

The catalyst was found to have a Ti/W/V (atomic proportions) of 93/5/2, and a P/(Mo+V) (atomic ratio) of 0.5.

Comparative Examples 1 and 2

The procedure of Example 1 or 2 was repeated, except that phosphoric acid was not added, to thereby prepare a catalyst.

Examples 3 to 7

Titanium oxide (specific surface area: 290 m$^2$/g, product of Ishihara Sangyo K.K.) (900 g), ammonium molybdate (107 g), ammonium metavanadate (28.3 g), 85% phosphoric acid (88 g, 123 g, 177 g, 212 g, or 265 g, respectively), silica sol (trade name: OS Sol, product of Nissan Chemical Industries, Ltd.) (404 g) were placed in a kneader, and then kneaded for 60 minutes. Thereafter, while silica-alumina ceramic fiber (product of Toshiba Fine Flex K.K.) (151 g) was gradually added to the mixture, the mixture was kneaded for 30 minutes, to thereby obtain a catalyst paste having a water content of 27%. The paste was applied onto a base material (thickness: 0.7 mm) produced by subjecting a SUS 430 stainless steel plate (thickness: 0.2 mm) to a metal-lath processing; the base material was sandwiched between two polyethylene sheets; and the thus-sandwiched base material was passed through a pair of pressure rollers so that the meshes provided in the metal lath base were filled with the paste. The paste-filled base material was air-dried, and then calcined at 500° C. for two hours, to thereby obtain a catalyst of the present invention. The catalyst was found to have a P/(Mo+V) (atomic ratio) of 0.5, 0.7, 1.0, 1.2, and 1.5, which respectively corresponds to the aforementioned phosphoric acid amount.

Comparative Example 3

The procedure of Example 3 was repeated, except that phosphoric acid was not added, to thereby prepare a catalyst.

Example 8

Molybdenum trioxide (41 g) and ammonium metavanadate (41 g) were added to and dissolved in water (360 g) with stirring under heating at 40° C., to thereby prepare a solution containing a compound represented by the rational formula $(NH_3)_3Mo_2V_3O_{15}$. 85% Phosphoric acid (55 g) was added to the thus-prepared solution, to thereby obtain a uniform solution.

While titanium oxide (specific surface area: 290 m$^2$/g, product of Ishihara Sangyo K.K.) (900 g), silica sol (trade name: OS Sol, product of Nissan Chemical Industries, Ltd.) (404 g), and silica-alumina ceramic fiber (product of Toshiba Fine Flex K.K.) (151 g) were sequentially added to the above-obtained solution, the resultant mixture was kneaded by means of a kneader, to thereby obtain a paste. The paste was applied onto a base material (thickness: 0.7 mm) produced by subjecting a SUS 430 stainless steel plate (thickness: 0.2 mm) to a metal-lath processing; the base material was sandwiched between two polyethylene sheets; and the thus-sandwiched base was passed through a pair of pressure rollers so that the meshes provided in the metal lath were filled with the paste. The paste-filled base material was air-dried, and then calcined at 500° C. for two hours, to thereby obtain a catalyst of the present invention. The catalyst was found to have a Ti/Mo/V (atomic proportions) of 95/2/3, and a P/(Mo+V) (atomic ratio) of 0.8.

Example 9

Molybdenum trioxide (41 g) and ammonium metavanadate (41 g) were added to and dissolved in water (360 g) with stirring under heating at 40° C., to thereby prepare a solution containing a compound represented by the rational formula $(NH_3)_3Mo_2V_3O_{15}$. 85% Phosphoric acid (55 g) was added to the thus-prepared solution, to thereby obtain a uniform solution.

Separately, titanium oxide (specific surface area: 290 m$^2$/g, product of Ishihara Sangyo K.K.) (900 g), silica sol (trade name: OS Sol, product of Nissan Chemical Industries, Ltd.) (404 g), and water (360 g) were kneaded by means of a kneader, to thereby obtain a paste. While silica-alumina ceramic fiber (product of Toshiba Fine Flex K.K.) (151 g) was added to the thus-obtained paste, the resultant mixture was kneaded, to thereby obtain a paste. The paste was applied onto a base material (thickness: 0.7 mm) produced by subjecting a SUS 430 stainless steel plate (thickness: 0.2 mm) to a metal-lath processing; the base was sandwiched between two polyethylene sheets; and the thus-sandwiched base material passed through a pair of pressure rollers so that the meshes provided in the metal lath were filled with the paste. The paste-filled base material was air-dried, and then calcined at 500° C. for two hours, to thereby obtain a TiO$_2$ catalyst carrier.

The carrier was immersed in the above-prepared solution, and then drained, followed by drying at 120° C., and subsequent calcinating at 450° C., to thereby obtain a catalyst of the present invention. The catalyst was estimated to have a Ti/Mo/V (atomic proportions) of 95/3/4.5, and a P/(Mo+V) (atomic ratio) of 0.8.

Comparative Examples 4 and 5

The procedure of Example 8 or 9 was repeated, except that phosphoric acid was not added, to thereby prepare a catalyst.

Examples 10 to 12

The procedure of Example 1 was repeated, except that the amount of ammonium molybdate was changed from 107 g to 117 g, 44 g, and 231 g, respectively; the amount of ammonium metavanadate was changed from 28 g to 155 g, 101 g, and 61 g, respectively; and phosphoric acid (68 g) was substituted by ammonium dihydrogenphosphate (228 g, 128 g, and 210 g, respectively), to thereby obtain catalysts.

The catalysts were found to have a Ti/Mo/V of 85/5/10, 91/2/7, and 86/10/4, respectively, and a P/(Mo+V) (atomic ratio) of 1.0.

Comparative Examples 6 to 8

The procedure of Examples 10 to 12 was repeated, except that phosphoric acid was not added, to thereby prepare a catalyst.

Use Example

Each of the catalysts prepared in Examples 1 to 12 and Comparative Examples 1 to 8 was cut into test pieces, each having a width of 20 mm and a length of 100 mm. Three test pieces of each catalyst were mounted in a catalyst unit, and the catalyst pieces were exposed to an exhaust gas under the conditions shown in Table 1 or 2. Table 1 shows exhaust gas treatment conditions for determining percent NO removal and percent mercury oxidation, and Table 2 shows exhaust gas treatment conditions for determining percent $SO_2$ oxidation. The results are shown in Table 3.

Percent $NO_X$ removal was determined through measurement of $NO_X$ concentration at the inlet and outlet of a catalyst layer by means of a chemiluminescent $NO_X$ analyzer. Percent mercury oxidation was determined by causing oxidized mercury vapor to be absorbed in phosphate buffer, and then analyzing metallic vapor through the analysis method according to JIS K-0222. Percent $SO_2$ oxidation was determined through measurement of $SO_2$ concentration at the inlet and outlet of the catalyst layer by means of an infrared $SO_2$ meter.

TABLE 1

| Item | Value |
| --- | --- |
| 1. Gas composition | |
| $NO_x$ | 300 ppm |
| $NH_3$ | 300 ppm |
| $SO_2$ | 1000 ppm |
| $O_2$ | 3% |
| $CO_2$ | 12% |
| $H_2O$ | 12% |
| Hg | 10 ng/L |
| HCl | 30 ppm |
| 2. Gas flow rate | 3 L/min |
| 3. Temperature | 350° C. |
| 4. Number of catalyst pieces | 20 mm (width) × 100 mm (full length), 3 pieces |

TABLE 2

| Item | Value |
| --- | --- |
| 1. Composition | |
| $SO_2$ | 500 ppm |
| $O_2$ | 3% |
| 2. Gas flow rate | 1.2 L/min |
| 3. Temperature | 380° C. |
| 4. Number of catalyst pieces | 20 mm (width) × 100 mm (full length), 3 pieces |

TABLE 3

| Section | Ti/Mo/V atomic proportions or Ti/W/V atomic proportions | P/(Mo + V) atomic ratio or P/(W + V) atomic ratio | Catalytic performance (%) | | |
| --- | --- | --- | --- | --- | --- |
| | | | Percent $SO_2$ oxidation | Percent $NO_x$ removal | Percent Hg oxidation |
| Ex. 1 | 93/5/2 | 0.5 | 0.7 | 94 | 60 |
| Ex. 2 | 93/5/2 | 0.5 | 0.6 | 94 | 55 |
| Ex. 3 | 88/5/7 | 0.2 | 2.0 | 98 | 87 |
| Ex. 4 | 88/5/7 | 0.7 | 1.2 | 97 | 85 |
| Ex. 5 | 88/5/7 | 1.0 | 0.9 | 96 | 82 |
| Ex. 6 | 88/5/7 | 1.2 | 0.6 | 94 | 81 |
| Ex. 7 | 88/5/7 | 1.5 | 0.4 | 93 | 81 |
| Ex. 8 | 95/2/3 | 0.8 | 0.6 | 95 | 70 |
| Ex. 9 | 95/2/3 | 0.8 | 0.5 | 94 | 71 |
| Ex. 10 | 85/5/10 | 1.0 | 1.1 | 97 | 83 |
| Ex. 11 | 91/2/7 | 1.0 | 1.3 | 97 | 76 |
| Ex. 12 | 86/10/4 | 1.0 | 0.8 | 93 | 73 |
| Comp. Ex. 1 | 93/5/2 | 0 | 2.7 | 97 | 63 |
| Comp. Ex. 2 | 93/5/2 | 0 | 2.8 | 97 | 58 |
| Comp. Ex. 3 | 88/5/7 | 0 | 23 | 98 | 85 |
| Comp. Ex. 4 | 95/2/3 | 0 | 3.9 | 97 | 72 |
| Comp. Ex. 5 | 85/5/10 | 0 | 28 | 98 | 87 |
| Comp. Ex. 6 | 91/2/7 | 0 | 29 | 98 | 81 |
| Comp. Ex. 7 | 86/10/4 | 0 | 6.4 | 96 | 77 |

As is clear from test data of the catalysts of Examples 1 to 12 and Comparative Examples 1 to 8, a catalyst of the present invention having almost the same Ti/(Mo or W)/V proportion as a comparative catalyst maintains high percent $NO_X$ removal and percent mercury (Hg) oxidation comparable to those of the comparative catalyst, and exhibits very low percent $SO_2$ oxidation; i.e., ¼ to ⅒ or less that of the comparative catalyst. These data indicate that the catalyst of the present invention, which contains a specific amount of phosphoric acid or a phosphate salt, exhibits very excellent performance; i.e., maintains high percent $NO_X$ removal and high mercury oxidation activity, and reduces percent $SO_2$ oxidation.

The invention claimed is:

1. A catalyst for purifying an exhaust gas containing metallic mercury (Hg) comprising a composition containing oxides of (i) titanium (Ti), (ii) molybdenum (Mo) and/or tungsten (W), (iii) vanadium (V), and (iv) phosphorus (P), wherein the catalyst contains Ti, Mo and/or W, and V in atomic proportions of 85 to 97.5:2 to 10:0.5 to 10, and has an atomic ratio of P/(sum of V and Mo and/or W) of 0.5 to 1.5.

2. A catalyst according to claim 1, wherein component (ii) consists of molybdenum (Mo).

3. A catalyst according to claim 1, wherein component (ii) consists of tungsten (W).

4. A catalyst according to claim 1, wherein component (ii) consists of molybdenum (Mo) and tungsten (W).

5. A catalyst according to claim 1, wherein the atomic ratio of P/(sum of V and Mo and/or W) of 0.7 to 1.2.

6. A catalyst according to claim 1, wherein the atomic ratio of P/(sum of V and Mo and/or W) of about 1.

7. A catalyst for purifying an exhaust gas containing metallic mercury (Hg) comprising a composition consisting of oxides of (i) titanium (Ti), (ii) molybdenum (Mo) and/or tungsten (W), (iii) vanadium (V), and (iv) phosphorus (P), wherein the catalyst contains Ti, Mo and/or W, and V in atomic proportions of 85 to 97.5:2 to 10:0.5 to 10, and has an atomic ratio of P/(sum of V and Mo and/or W) of 0.5 to 1.5.

8. A catalyst according to claim 7, wherein component (ii) consists of molybdenum (Mo).

9. A catalyst according to claim 7, wherein component (ii) consists of tungsten (W).

10. A catalyst according to claim 7, wherein component (ii) consists of molybdenum (Mo) and tungsten (W).

11. A catalyst according to claim 7, wherein the atomic ratio of P/(sum of V and Mo and/or W) of 0.7 to 1.2.

12. A catalyst according to claim 7, wherein the atomic ratio of P/(sum of V and Mo and/or W) of about 1.

* * * * *